US010399658B2

(12) United States Patent
Von-Wilmowsky et al.

(10) Patent No.: US 10,399,658 B2
(45) Date of Patent: Sep. 3, 2019

(54) AIRCRAFT STRUCTURAL COMPONENT THAT IS ADAPTED FOR ABSORBING AND TRANSMITTING FORCES IN AN AIRCRAFT (71) Applicant: AIRBUS HELICOPTERS DEUTSCHLAND GMBH, Donauworth (DE)

(72) Inventors: Kaspar Von-Wilmowsky, Donauworth (DE); Christian Reichensperger, Asbach Baeumenheim (DE); Andreas Rack, Burghausen (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 492 days.

(21) Appl. No.: 15/176,292

(22) Filed: Jun. 8, 2016

(65) Prior Publication Data

US 2016/0375979 A1 Dec. 29, 2016

(30) Foreign Application Priority Data

Jun. 29, 2015 (EP) ..................................... 15400026

(51) Int. Cl.
*B64C 1/06* (2006.01)
*B64C 1/00* (2006.01)
(Continued)

(52) U.S. Cl.
CPC ................ *B64C 1/069* (2013.01); *B64C 1/00* (2013.01); *B64C 1/064* (2013.01); *B64C 25/10* (2013.01);
(Continued)

(58) Field of Classification Search
CPC ......... B64C 1/069; B64C 25/20; B64C 1/064; B64C 25/34; B64C 25/10; B64C 27/00;
(Continued)

(56) References Cited

U.S. PATENT DOCUMENTS 3,991,957 A * 11/1976 Neumann ............... B64C 25/16
244/102 R
7,413,140 B2    8/2008 Bietenhader
(Continued)

FOREIGN PATENT DOCUMENTS

EP    1714867       10/2006
EP    2368792 A2 *  9/2011 ............. B64C 3/185
(Continued)

OTHER PUBLICATIONS

Extended European Search Report for European Application No. EP 15400026.9, Completed by the European Patent Office, dated Dec. 21, 2015, 9 Pages.

*Primary Examiner* — Assres H Woldemaryam
(74) *Attorney, Agent, or Firm* — Brooks Kushman P.C.

(57) ABSTRACT

An aircraft structural component that is adapted for absorbing and transmitting forces in an aircraft, the aircraft structural component comprising at least one panel element and at least one reinforcing structure. The at least one reinforcing structure is rigidly attached to the at least one panel element such that at least one cavity is defined between the at least one panel element and the at least one reinforcing structure, the at least one cavity being adapted for distributing forces that are absorbed by the aircraft structural component in operation.

20 Claims, 9 Drawing Sheets

(51) Int. Cl.
*B64C 25/10* (2006.01)
*B64C 25/20* (2006.01)
*B64C 25/34* (2006.01)
*B64C 27/00* (2006.01)
*B64C 27/04* (2006.01)
*B64C 25/32* (2006.01)
*F16B 5/01* (2006.01)
*F16B 9/00* (2006.01)
*F16B 11/00* (2006.01)

(52) U.S. Cl.
CPC .............. *B64C 25/20* (2013.01); *B64C 25/34* (2013.01); *B64C 27/00* (2013.01); *B64C 27/04* (2013.01); *B64C 2001/0054* (2013.01); *B64C 2025/325* (2013.01); *F16B 5/01* (2013.01); *F16B 9/00* (2013.01); *F16B 11/006* (2013.01)

(58) Field of Classification Search
CPC ..... B64C 1/00; B64C 2025/325; B64C 27/04; B64C 2001/0054; F16B 9/00; F16B 5/01; F16B 11/006
See application file for complete search history.

(56) References Cited

U.S. PATENT DOCUMENTS

| | | | |
|---|---|---|---|
| 2010/0129589 A1* | 5/2010 | Senibi | B32B 5/18 428/71 |
| 2011/0045232 A1* | 2/2011 | Kismarton | B29C 65/562 428/113 |
| 2011/0229333 A1 | 9/2011 | Flach | |
| 2013/0020438 A1* | 1/2013 | Glynn | B64C 1/061 244/129.1 |
| 2013/0125354 A1 | 5/2013 | Benthien et al. | |
| 2014/0373315 A1* | 12/2014 | Benthien | B64C 1/18 24/449 |

FOREIGN PATENT DOCUMENTS

| | | | |
|---|---|---|---|
| EP | 2368792 A2 | 9/2011 | |
| EP | 2368792 A3 | 11/2012 | |
| EP | 2818403 | 12/2014 | |
| EP | 2818403 A1 * | 12/2014 | ............... B64C 1/18 |

* cited by examiner

AIRCRAFT STRUCTURAL COMPONENT THAT IS ADAPTED FOR ABSORBING AND TRANSMITTING FORCES IN AN AIRCRAFT

CROSS REFERENCE TO RELATED APPLICATION

This application claims priority to European patent application No. EP 15400026.9 filed on Jun. 29, 2015, the disclosure of which is incorporated in its entirety by reference herein.

BACKGROUND OF THE INVENTION (1) Field of the Invention

The invention is related to an aircraft structural component that is adapted for absorbing and transmitting forces in an aircraft.

In general, aircraft structural components are used in aircrafts to strengthen locations where comparatively high loads must be transferred between different aircraft elements or structures. By way of example, such comparatively high loads occur with respect to a wheel-type landing gear of an aircraft and, more particularly, during landing of the aircraft, when comparatively high landing loads are induced via corresponding landing gear wheels of the wheel-type landing gear into the aircraft's fuselage. For instance, if the aircraft is embodied as a rotary wing aircraft and, more particularly, as a 10 t-helicopter, vertical and horizontal loads of approximately 55 kN occur at a wheel-type nose landing gear of this helicopter and must be transferred to its fuselage.

(2) Description of Related Art

As the fuselages of today's rotary wing aircrafts are more and more implemented using fiber reinforced polymer (FRP) material, such vertical and horizontal loads occurring at a wheel-type nose landing gear of the rotary wing aircraft must be transferred to the FRP fuselage. This must be done by means of a suitable aircraft structural component that is adapted for absorbing forces from the wheel-type nose landing gear and for transmitting the absorbed forces to the FRP fuselage, in order to avoid damages to the fuselage during occurrence of the vertical and horizontal loads, i.e. particularly during landing.

The document U.S. Pat. No. 7,413,140 describes a rotary wing aircraft with an FRP fuselage and a wheel-type nose landing gear. The latter is attached to the FRP fuselage by means of an aircraft structural component that is implemented by using a machined bracket.

Usually, such a machined bracket consists of an aluminum alloy such that corrosion thereof can at least be limited. The machined bracket is generally screwed or riveted, e.g. by means of Hi-Locks or Huck-bolts, to the FRP fuselage of the rotary wing aircraft. More specifically, the machined bracket is usually attached to longerons or crossmembers of a force-absorbing structure of the FRP fuselage and equipped with slide bearings, if the wheel-type nose landing gear is retractable.

However, such a machined bracket is comparatively costly and heavy. Furthermore, mounting of the machined bracket to the rotary wing aircraft is a complicated and laborious task, which is time-consuming and expensive. Moreover, for riveting the machined bracket to the FRP fuselage, the latter must be provided with corresponding rivet-receiving openings, which are potential failure sources. In addition, such a machined bracket must efficiently be protected against corrosion by suitable measures, as even aluminum brackets may be affected by long-term corrosion. Finally, metal parts in general and, thus, also the machined aluminum bracket and corresponding screws and/or rivets that are used for attaching the latter to the FRP fuselage are as such prone to fatigue.

The document US 2014/373315 describes an aircraft structural component with an FRP panel element and an FRP reinforcing element, which solves at least part of the above-described problems concerning use of a machined bracket made of an aluminum alloy. The FRP panel element is provided with a first opening extending therethrough and the reinforcing element is provided with a second opening extending therethrough, both openings being aligned. A bushing that is adapted to receive an attachment device for attaching a load to the aircraft structural component extends through both openings. Between the FRP panel element and the FRP reinforcing element a connecting element is arranged, which connects the FRP reinforcing element to the FRP panel element in a region of the FRP panel element adjacent to the first opening that extends through the FRP panel element. This connecting element between the FRP panel element and the FRP reinforcing element defines a hook and loop connection. More specifically, the connecting element comprises a first section with a first plurality of hook and loop elements, which is disposed on the FRP panel element, and a second section with a second plurality of hook and loop elements, which is disposed on the FRP reinforcing element. The first and the second plurality of hook and loop elements are adapted to interact with each other so as to produce a hook and loop connection between the FRP panel element and the FRP reinforcing element.

The document US 2013/125354 describes the connecting element that is used in the aircraft structural component according to the document US 2014/373315 in greater detail. However, this connecting element in the form of an additional hook and loop layer defines a detachable connection and is not designed to transfer comparatively high shear loads that occur e.g. in a wheel-type nose landing gear of a rotary wing aircraft as described above. Furthermore, due to application of such an additional hook and loop layer to the aircraft structural component, the latter becomes comparatively heavy. Moreover, this additional hook and loop layer is complicated and time-consuming in manufacture and, thus, expensive.

The document US 2011/045232 describes a stringer for an aerospace vehicle. The stringer performs transferring bending loads in skin panels, and stiffening the skin panels so the panels don't buckle under loading. The stringers and skin panels may be made of fiber composites such as carbon fiber reinforced plastic (CFRP). The composite stiffener has a stack of plies of reinforcing fibers and may be used in any aircraft structures that require stiffening. Such a stringer includes a web between a first flange and a second base, or is a Z-beam, a blade, a C-channel, a hat beam. In embodiments, the second base is co-cured with the skin panel.

Other documents were considered: US 2010/129589, US 2013/020438 and US 2011/229333.

BRIEF SUMMARY OF THE INVENTION

It is, therefore, an object of the present invention to provide an aircraft structural component that is adapted for absorbing and transmitting forces in an aircraft and, in particular, in a rotary wing aircraft, said aircraft structural component being inherently protected against corrosion and exhibiting a comparatively low weight and a high resistance against forces that are to be absorbed and transferred, while providing for an improved distribution of absorbed forces.

This object is solved by an aircraft comprising the features of claim 1.

More specifically, according to the present invention an aircraft structural component that is adapted for absorbing and transmitting forces in an aircraft comprises at least one panel element and at least one reinforcing structure. The at least one reinforcing structure is rigidly attached to the at least one panel element such that at least one cavity is defined between the at least one panel element and the at least one reinforcing structure. The at least one cavity is adapted for distributing forces that are absorbed by the aircraft structural component in operation.

According to one aspect of the present invention, the at least one panel element and the at least one reinforcing structure are provided with at least one bearing element and the at least one reinforcing structure is spaced apart from the at least one panel element at least in the vicinity of this bearing element by an associated spacer. Preferably, the at least one reinforcing structure, the at least one panel element and the spacer are preloaded in axial direction of the spacer with a screw nut that is attached by means of a screw connection to a bearing sleeve wall, on which the spacer may be accommodated. Preferentially, the spacer comprises FRP material, which may already be in a hard condition, i.e. cured, prior to a collective curing of the at least one reinforcing structure and the at least one panel element.

According to one aspect of the present invention, the at least one panel element defines a longeron in a force-absorbing structure provided at a fuselage of an aircraft and the force-absorbing structure further comprises at least one crossmember that is arranged in a predetermined angle to said longeron. Preferably, the at least one reinforcing structure is diagonally oriented from the vicinity of an associated crossmember to the vicinity of a floor or bottom shell of the aircraft. Alternatively, the at least one reinforcing structure can be oriented vertically from the vicinity of the floor to the vicinity of the bottom shell.

Advantageously, the inventive aircraft structural component is manufactured as an integral part of a FRP-longeron in a force-absorbing structure provided at the fuselage and does, thus, not require any additional laborious installation as required with the above-described machined brackets. In particular, the inventive aircraft structural component permits a strong reinforcement of the fuselage in a region, where comparatively high forces are transmitted to the fuselage. Furthermore, as the inventive aircraft structural component is implemented by FRP material, an expensive supplementary corrosion protection can be omitted and it is not prone to fatigue. Moreover, the inventive aircraft structural component has less weight and a lighter structure than the above-described machined brackets with screws and/or rivets, compared to which a weight reduction of approximately 30% can be achieved. This leads to a saving in weight for a rotary wing aircraft, and in particular for a helicopter, of up to 2 kg.

According to one aspect of the present invention, the at least one panel element of the inventive aircraft structural component is defined by a FRP-longeron in a force-absorbing structure provided at a fuselage of an aircraft, in particular of a rotary wing aircraft and, more particularly, of a helicopter. Preferably, the aircraft structural component is a FRP component that is provided with at least one FRP-hollow body with preferably approximately 25 mm wall distance in height direction of the helicopter, which is e.g. provided in the area of a landing gear attachment of the helicopter. The FRP-hollow body can be filled with a foam core or a honeycomb core or can be designed without a durable core by means of a dissolvable core. The FRP-hollow body can also be manufactured separately and attached to the FRP-longeron of the force-absorbing structure without using any core, e.g. by means of a riveted and/or bonded connection. However, it should be noted that according to the properties of a foam or honeycomb core, the underlying filled FRP-hollow body is still understood as a hollow structure in the context of the present invention.

Advantageously, the FRP-hollow body increases an underlying distance between corresponding outer surfaces of the FRP-longeron in the area of the aircraft structural component, i.e. a local thickness of a respective FRP-longeron. Consequently, this results e.g. in a landing gear attachment that is suitable to transfer all load components that are applied in operation, thereby resulting in a lighter design of the overall construction comprising the inventive aircraft structural component compared to a state of the art machined bracket. This applies particularly for transversal loads.

According to one aspect of the present invention, in the case of a landing gear attachment with cores for a comparatively heavy helicopter, i.e. a helicopter of the 10 t-class for instance, a corresponding core in the FRP-hollow body has nowadays no sufficient proportion of load support due to currently available core materials with too little core shear strength. In this case, the core can be used exclusively for manufacturing reasons and may presumably shatter in operation while corresponding FRP-walls of the FRP-hollow body would be adapted to transfer occurring transversal loads due to their strength. For a smaller helicopter, i.e. a helicopter of the 5 t-class or smaller, the relation between landing gear forces and core shear strength is presumably better for the force transfer with core support resulting in a lighter design compared to the coreless alternative. This applies likewise to an aircraft structural component that does not only comprise a single FRP-hollow body that is applied to only one side of a respective longeron, but instead also to a doubled FRP-hollow body that is applied to both sides of the FRP-longeron.

More specifically, according to one aspect of the present invention, each FRP-hollow body can either be formed by a dissolvable core, a foam core or a honeycomb core and is integrated into the inventive aircraft structural component while being cured together with the FRP-longeron of the force-absorbing structure. The FRP-hollow body may extend along a predetermined direction, e.g. vertically over the entire length of the aircraft structural component, and be connected on and/or to both sides to the FRP-longeron; in the case of a wheel-type nose landing gear it would e.g. extend between the bottom shell and the cockpit floor. A very strong attachment can also be achieved by a diagonally arranged FRP-hollow body connecting an area near a frame with an area near the cockpit floor. Thereby, a sufficient transversal load transfer is achieved.

According to one aspect of the present invention, in a given curing tool of each FRP-longeron besides its fabric-prepreg and cores, e.g. the above-mentioned honeycomb cores, there is preferably additionally placed at least one core that is covered by fabric-prepreg to be cured collectively. The curing process in an associated autoclave is preferentially, but not necessarily, performed according to common manufacturing processes. In the case of using dissolvable cores, there are preferably at least two holes to be provided, e.g. drilled, in the cured FRP-hollow bodies for each core in order to be able to flush the cores out, e.g. with an adequate dissolver. Foam cores or honeycomb cores, however, may remain in the FRP-hollow bodies. In the case of separately manufacturing the FRP-longeron and the FRP-hollow body, provision of a core for manufacturing reasons can be omitted.

Preferably, the FRP-hollow bodies and the FRP-longerons define a common opening or coaxially arranged openings that are aligned in the rotary wing aircraft's width direction, and wherein a bushing that is e.g. consisting of a titanium-alloy, stainless stell or bronze is placed. This bushing is used as a slide bearing or houses a slide bearing.

In case of a helicopter's wheel-type nose landing gear, a given attachment of the landing gear consists usually of two parts that are mirrored to the landing gear FRP-longerons with at least one integrated FRP-hollow body on each FRP-longeron and two cylinders to transmit respective landing gear forces. Through each cylinder there will be assembled a bolt, which aligns to a hole in the wheel-type nose landing gear and transmits the respective landing gear forces into the FRP-fuselage. Thereby, the landing gear is pivot-mounted relative to this bolt-axis to retract it. According to the landing gear design the bolts can be mounted into the bushings either from outside or inside and can be fixed by transversal bolts. Washers can be used for axial gap adjustment.

According to a preferred embodiment, the at least one reinforcing structure comprises at least one strap-like element. The at least one strap-like element is rigidly attached to the at least one panel element.

According to a further preferred embodiment, the at least one strap-like element is rigidly attached to the at least one panel element by means of riveting and/or bonding.

According to a further preferred embodiment, the at least one reinforcing structure comprises a groove-like cross section. The at least one reinforcing structure is rigidly attached to the at least one panel element by means of riveting and/or bonding.

According to a further preferred embodiment, the at least one panel element and the at least one reinforcing structure comprise fiber reinforced polymers.

According to a further preferred embodiment, the at least one reinforcing structure is rigidly attached to the at least one panel element by means of a collective curing.

According to a further preferred embodiment, the at least one cavity is at least partly filled with a foam core and/or a honeycomb core.

According to a further preferred embodiment, at least one additional cavity is defined adjacent to the at least one cavity between the at least one panel element and the at least one reinforcing structure. The at least one additional cavity is at least partly filled with a foam core and/or a honeycomb core.

According to a further preferred embodiment, the at least one panel element defines a longeron in a force-absorbing structure provided at a fuselage of an aircraft. The aircraft structural component is adapted for pivotally bearing a rotatable shaft of a wheel-type landing gear.

According to a further preferred embodiment, a force transmitting attachment shaft is provided for pivotally connecting a rotatable shaft of a wheel-type landing gear to the at least one panel element and the at least one reinforcing structure. The force transmitting attachment shaft is non-pivotally connectable to the rotatable shaft by means of at least one associated fixation bolt.

According to a further preferred embodiment, the at least one panel element and the at least one reinforcing structure are provided with at least one bearing element. The force transmitting attachment shaft is pivotally accommodated in the at least one bearing element.

According to a further preferred embodiment, the at least one reinforcing structure is arranged with a predetermined shaping around the force transmitting attachment shaft.

According to a further preferred embodiment, the at least one reinforcing structure is provided on either side of the at least one panel element.

According to a further preferred embodiment, the at least one reinforcing structure is provided with a first geometry on a first side of the at least one panel element and with a second geometry on a second side of the at least one panel element.

According to a further preferred embodiment, the at least one reinforcing structure comprises at least one opening that is adapted to allow washing out of a dissolvable core provided in the at least one cavity.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
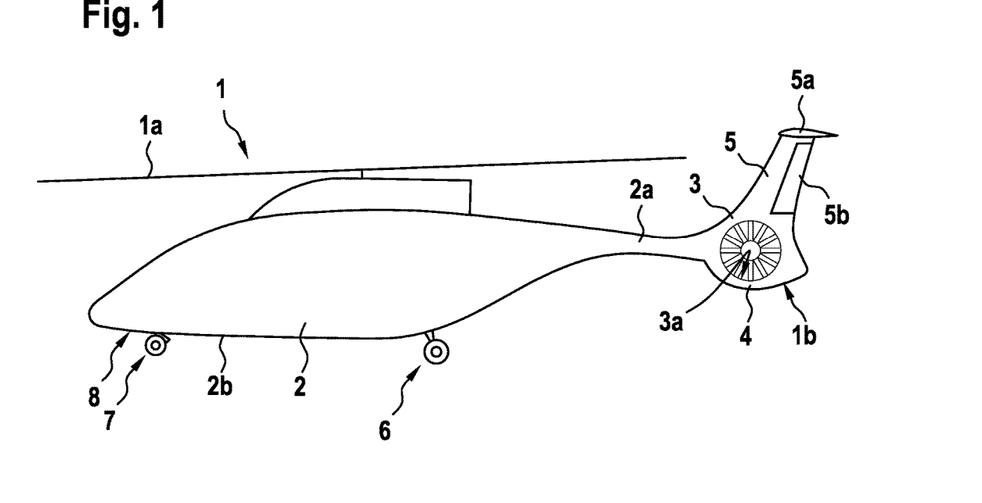
FIG. 1 shows a side view of a rotary wing aircraft with a wheel-type landing gear according to the present invention.

FIG. 1 shows a vehicle 1 that is exemplarily illustrated as an aircraft, in particular as a rotary wing aircraft and, more particularly, as a helicopter. Thus, for purposes of simplicity and clarity, the vehicle 1 is hereinafter referred to as the "helicopter 1". The present invention is, however, not limited to helicopters and can likewise be applied to any other vehicle, for instance a vehicle that is controllable in a flowing medium, such as air or water, independent of a particular configuration thereof. Therefore, the helicopter 1 is only briefly described by way of example for illustrating a possible field of application of the present invention, but not for restricting the present invention thereto.

The helicopter 1 illustratively comprises a fuselage 2 that defines a tail boom 2a. According to one aspect of the present invention, the fuselage 2 comprises a bottom shell 2b that is equipped with a force-absorbing structure 8. Preferably, the force-absorbing structure 8 is at least adapted to support a wheel-type landing gear 6, 7 of the helicopter 1 that is illustratively implemented by a wheel-type rear landing gear 6 and a wheel-type front landing gear 7. The latter is hereinafter also referred to as the "wheel-type nose landing gear 7".

Furthermore, the helicopter 1 comprises at least one main rotor 1a that is configured to provide lift and forward thrust during operation, and at least one counter-torque device 1b configured to provide counter-torque during operation, i.e. to counter the torque created by rotation of the at least one main rotor 1a for purposes of balancing the helicopter 1 in terms of yaw. The at least one counter-torque device 1b is illustratively provided at an aft section 3 of the tail boom 2a and, more specifically, at a shroud 3a of this aft section 3 of the tail boom 2a. The shroud 3a is preferably embodied for implementation of a Fenestron® tail rotor of the at least one counter-torque device 1b.

The aft section 3 of the tail boom 2a is further provided with a bumper 4 and a fin 5 in the form of a T-tail having a tail wing 5a and a rudder 5b. The tail wing 5a is preferably adjustable in its inclination and can overtake the functioning of a horizontal stabilizer. Alternatively, or in addition, the helicopter 1 is provided with a suitable horizontal stabilizer. The rudder 5b is preferably adapted to provide for enhanced directional control of the helicopter 1 and can be deflected to large angles to reduce a given lateral drag of the fin 5 in sideward flight. However, it should be noted that the T-tail configuration of the fin 5 and the rudder 5b, as well as the horizontal stabilizer, are merely described for illustrating one exemplary embodiment of the aft section 3 of the tail boom 2a, and not for limiting the invention accordingly. Instead, the aft section 3 of the tail boom 2a may comprise an arbitrary configuration, independent on whether a T-tail fin or an otherwise configured fin is provided, with or without a rudder and with or without a horizontal stabilizer.

Figure 2:
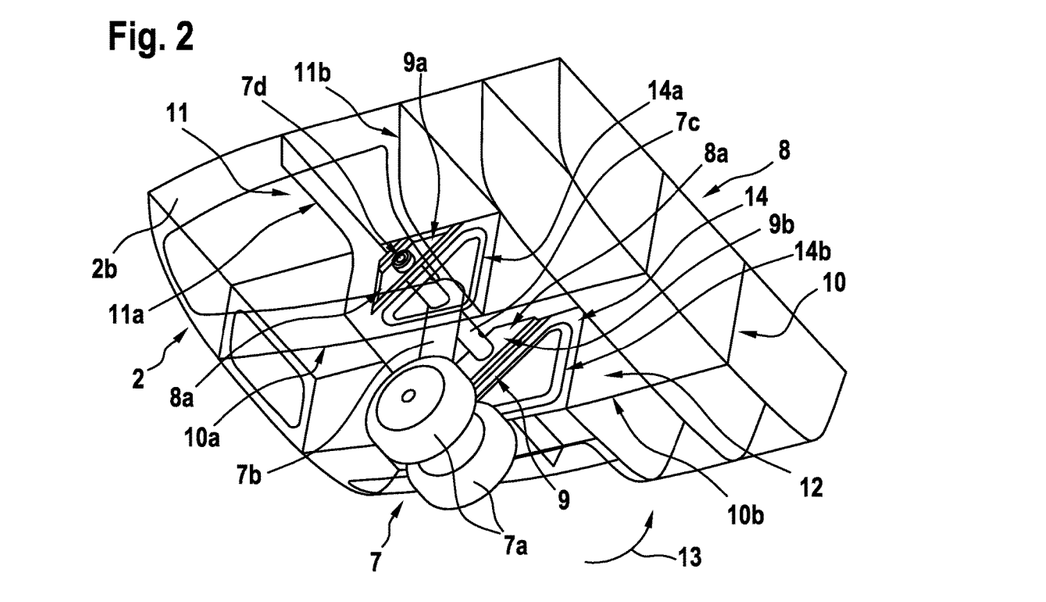
FIG. 2 shows a partly transparent perspective view of a force-absorbing structure of a fuselage of the rotary wing aircraft of FIG. 1, which is provided with one-sided, diagonally arranged aircraft structural components according to the present invention.

FIG. 2 shows the fuselage 2 of the helicopter 1 of FIG. 1 for further illustrating its force-absorbing structure 8 provided at the fuselage's bottom shell 2b in the region of the wheel-type nose landing gear 7. The latter comprises illustratively two wheels 7a, which are mounted to a mounting shaft 7b so as to be rotatable on this shaft 7b. The mounting shaft 7b, in turn, is mounted to a shaft 7c, which is preferably rotatable around an associated rotation axis 7d, which is illustratively parallel to a corresponding rotation axis of the two wheels 7a. Thus, the wheel-type nose landing gear 7 is exemplarily designed as a retractable landing gear that can be retracted from an illustrated landing position into an associated flight position by means of a suitable rotation around the rotatable shaft 7c, as indicated with an arrow 13. In the flight position, the wheel-type nose landing gear 7 is preferably accommodated in an associated landing gear bay 12.

According to one aspect of the present invention, the force-absorbing structure 8 comprises a plurality of longerons 10 and a plurality of crossmembers 11. The plurality of crossmembers 11 is preferably arranged with a predetermined angle relative to the plurality of longerons 10. The predetermined angle exemplarily amounts to approximately 90°.

More specifically, the plurality of longerons 10 preferably comprises at least two longerons 10a, 10b, which are preferentially implemented as panel elements and, more specifically, as elongated panels having a longitudinal extension that is at least approximately oriented in the longitudinal direction of the helicopter 1 of FIG. 1. The longeron 10a exemplarily defines a board side longeron and the longeron 10b a starboard side longeron, seen in forward flight direction of the helicopter 1 of FIG. 1. The plurality of crossmembers 11 preferably comprises at least two crossmembers 11a, 11b, which are preferentially also implemented as panel elements and, more specifically, as elongated panels having a longitudinal extension that is at least approximately oriented in the transverse direction of the helicopter 1 of FIG. 1. Illustratively, the crossmember 11a defines a front crossmember and the crossmember 11b defines a rear crossmember, seen in forward flight direction of the helicopter 1 of FIG. 1. By way of example, the front crossmember 11a, the rear crossmember 11b, the board side longeron 10a and the starboard side longeron 10b define the landing gear bay 12.

Preferably, the force-absorbing structure 8 as a whole, but at least each one of the two longerons 10a, 10b, comprises FRP material and is preferentially implemented as a FRP component, i.e. a composite component. Therefore, the force-absorbing structure 8 is also referred to hereinafter as the "FRP-force-absorbing structure" and each one of the longerons 10a, 10b is also referred to as a "FRP-longeron" hereinafter. Likewise, at least one of the crossmembers 11a, 11b comprises FRP material and is preferably implemented as a FRP component, i.e. a composite component. Therefore, each one of the two crossmembers 11a, 11b is also referred to hereinafter as a "FRP-crossmember".

According to one aspect of the present invention, the FRP-force-absorbing structure 8 further comprises aircraft structural components 8a, which are preferably embodied as integral parts of the two FRP-longerons 10a, 10b and provided at least in a region of the two FRP-longerons 10a, 10b, where the rotatable shaft 7c is mounted to the latter. Each aircraft structural component 8a is at least adapted for absorbing and transmitting forces in the helicopter 1 of FIG. 1 and, in the illustrated example, from its wheel-type nose landing gear 7 to its force-absorbing structure 8, i.e. the fuselage 2. Therefore, each aircraft structural component 8a is preferably adapted for pivotally bearing the rotatable shaft 7c. By way of example, each aircraft structural component 8a is diagonally oriented from the bottom shell 2b towards an outer surface of the fuselage 2, preferably, but not necessarily, over the entire height of the force-absorbing structure 8.

Preferably, each aircraft structural component 8a comprises a reinforcing structure 9 that reinforces the associated FRP-longeron 10a, 10b of the plurality of FRP-longerons 10 in a predetermined region. Illustratively, the board side FRP-longeron 10a is reinforced by a board side reinforcing structure 9a and the starboard side FRP-longeron 10b is reinforced by a starboard side reinforcing structure 9b. Furthermore, each aircraft structural component 8a exemplarily comprises an optional honeycomb core 14. Illustratively, the board side FRP-longeron 10a comprises an optional board side honeycomb core 14a and the starboard side FRP-longeron 10b comprises an optional starboard side honeycomb core 14b.

It should be noted that in FIG. 2 only the wheel-type nose landing gear 7 is shown and described for simplicity and clarity of the drawings and in order to explain the present invention by way of example with respect to this wheel-type nose landing gear 7. However, the present invention is not limited to an application with respect to such a wheel-type nose landing gear and can generally also be applied to the wheel-type rear landing gears 6 of FIG. 1. Even more generally, the present invention can be applied anywhere in the helicopter 1 where the aircraft structural component 8a can be used for absorbing and transmitting forces occurring in operation.

Figure 3:
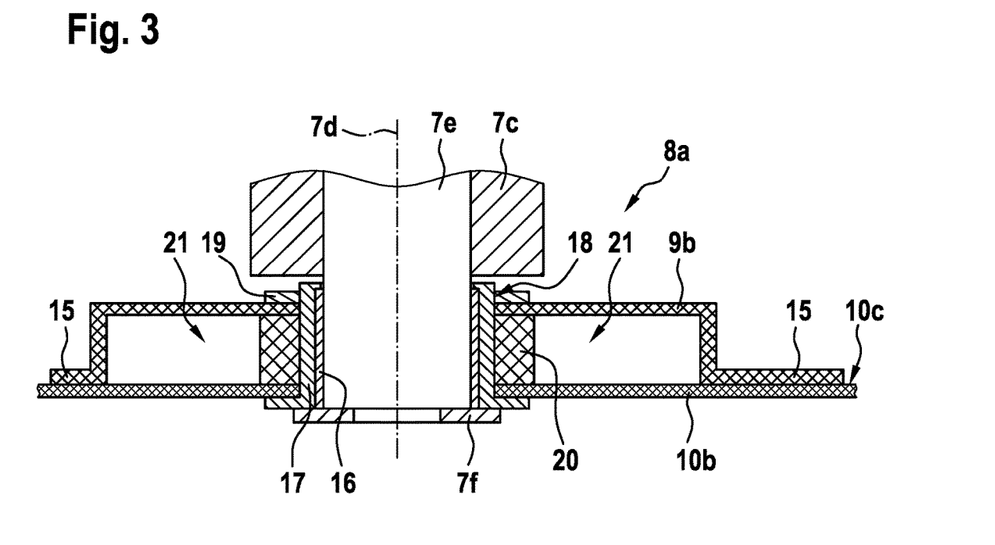
FIG. 3 shows a sectional view of one aircraft structural component of FIG. 2, which is embodied according to a first embodiment.

FIG. 3 shows the aircraft structural component 8a of FIG. 2. More specifically, FIG. 3 representatively illustrates the aircraft structural component 8a that is implemented as an integral part of the starboard side FRP-longeron 10b of FIG. 2 as an example for an aircraft structural component that is embodied according to the present invention. The aircraft structural component 8a is illustratively mounted to the rotatable shaft 7c of FIG. 2 via an attachment shaft 7e that is provided with a support flange 7f such that an inner side surface 10c of the starboard side FRP-longeron 10b, which is also referred to as the "inside" hereinafter for simplicity, faces the rotatable shaft 7c and, consequently, faces away from the support flange 7f.

According to one aspect of the present invention, the aircraft structural component 8a comprises at least one panel element, which is exemplarily embodied by the starboard side FRP-longeron 10b, and at least one reinforcing structure 9, which is exemplarily embodied by the starboard side reinforcing structure 9b that illustratively comprises an at least approximately rectangular groove-like cross section. The latter is preferably rigidly attached to the starboard side FRP-longeron 10b such that at least one cavity 21 is defined between the starboard side FRP-longeron 10b and the starboard side reinforcing structure 9b, thereby defining a FRP-hollow body. Illustratively, the at least one cavity 21 extends in cross section on both sides of the attachment shaft 7e. Preferentially, the at least one cavity 21 is adapted for distributing forces that are absorbed by the aircraft structural component 8a in operation.

Preferably, the starboard side reinforcing structure 9b is rigidly attached to the inside 10c of the starboard side FRP-longeron 10b. More specifically, the starboard side reinforcing structure 9b exemplarily comprises at least one strap-like element 15 and is in cross section illustratively provided with one strap-like element 15 on each side of the attachment shaft 7e. These strap-like elements 15 are used for rigidly attaching the starboard side reinforcing structure 9b to the inside 10c of the starboard side FRP-longeron 10b and are, therefore, rigidly attached to the starboard side FRP-longeron 10b.

According to one aspect of the present invention, the starboard side reinforcing structure 9b and/or at least the strap-like elements 15 comprise FRP material and are preferentially implemented as FRP components, i.e. composite components that are made of so-called prepregs. Therefore, the starboard side reinforcing structure 9b is also referred to as the "starboard side reinforcing FRP-structure" and the strap-like elements 15 are also referred to as the "strap-like FRP-elements" hereinafter. Thus, the aircraft structural component 8a can advantageously be manufactured in a single step by means of a collective curing of the starboard side FRP-longeron 10b and the starboard side reinforcing structure 9b with the strap-like elements 15, whereby the starboard side reinforcing structure 9b, i.e. its strap-like elements 15, are rigidly attached to the starboard side FRP-longeron 10b. In this case, the aircraft structural component 8a is embodied as an integral, one-piece component.

However, it should be noted that such a collective curing is only described by way of example and not for limiting the invention accordingly. Instead, the starboard side FRP-longeron 10b and the starboard side reinforcing FRP-structure 9b can alternatively be cured separately and subsequently be attached rigidly to each other, e.g. by means of riveting and/or bonding. For instance, the strap-like elements 15 can be bonded and riveted onto the starboard side FRP-longeron 10b.

According to one aspect of the present invention, the starboard side FRP-longeron 10b and the starboard side reinforcing FRP-structure 9b are provided with at least one bearing element 16. Illustratively, a single sleeve-like bearing element 16 is arranged on the attachment shaft 7e such that the latter is pivotally accommodated in the bearing element 16, i.e. rotatable relative to this bearing element 16.

Preferably, the bearing element 16 is accommodated in a bearing sleeve wall 17 such that the bearing element 16 is non-rotatable relative to this bearing sleeve wall 17. By way of example, the bearing element 16 is force- or press-fitted and/or form-fitted into the bearing sleeve wall 17, bonded and/or glued there into.

The bearing sleeve wall 17 is preferably made of titanium-alloy, stainless steel or bronze. According to one aspect of the present invention, the bearing sleeve wall 17 is inserted into the aircraft structural component 8a after curing. In this case, additional FRP-material must be foreseen in the aircraft structural component 8a before curing in order to allow matchdrilling of a hole basis fit without hurting the main structure of the cavities 21. Alternatively, the bearing sleeve wall 17 is positioned in the aircraft structural component 8a prior to curing and will, thus, be laminated with the overall structure.

Illustratively, the bearing sleeve wall 17 comprises an outer collar that abuts against the support flange 7f of the attachment shaft 7e, and an inner collar against which the bearing element 16 abuts. Thus, the latter is fixedly retained between the inner collar of the bearing sleeve wall 17 and the support flange 7f.

According to one aspect of the present invention, an external thread is provided on an outer circumference of the bearing sleeve wall 17, at least in the region of its inner collar. This external thread is provided so as to allow creation of a screw connection 18 between the bearing sleeve wall 17 and a screw nut 19, which is preferably made of titanium or a titanium-alloy. The screw connection 18 is preferably embodied to tighten the connection between the starboard side FRP-longeron 10b and the starboard side reinforcing FRP-structure 9b.

However, in order to maintain a predefined distance in a range of 15 mm to 35 mm, and preferably of at least approximately 25 mm, between the starboard side FRP-longeron 10b and the starboard side reinforcing FRP-structure 9b, a sleeve-like spacer 20 can be inserted in-between. According to one aspect of the present invention, this spacer 20 comprises FRP material and is preferentially implemented as a FRP component, i.e. a composite component, which can be cured together with the starboard side FRP-longeron 10b and the starboard side reinforcing FRP-structure 9b.

Alternatively, the spacer 20 can be implemented as a pre-cured component that is co-bonded into the aircraft structural component 8a. Such a co-bonded connection for the spacer 20 would be sufficient, as this connection is only subjected to pressure forces in operation.

Figure 4:
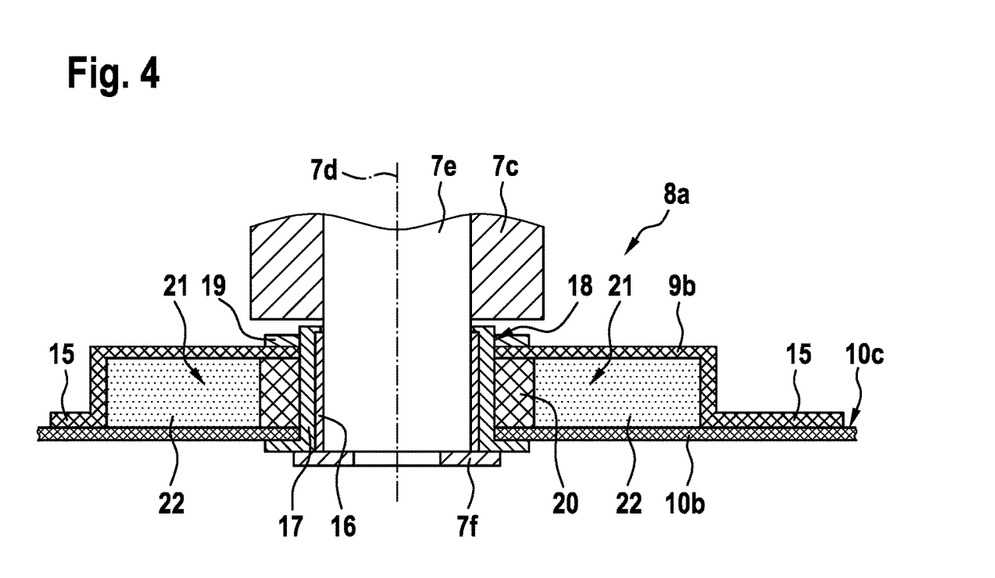
FIG. 4 shows the aircraft structural component of FIG. 3 that is provided with a foam core.

FIG. 4 shows the aircraft structural component 8a of FIG. 3 with the cavities 21. However, in contrast to FIG. 3, the cavities 21 are now illustratively at least partly filled with a foam core 22. If the cavities are entirely filled with the foam core 22, the latter preferentially serves at least as a spacing member for manufacturing reasons. More specifically, as the spacer 20 of FIG. 3 may be co-bonded to the aircraft structural component 8a after the above-described collective curing, the foam core 22 is preferably inserted into the cavities 21 prior to this curing so that it serves as spacing member.

Figure 5:
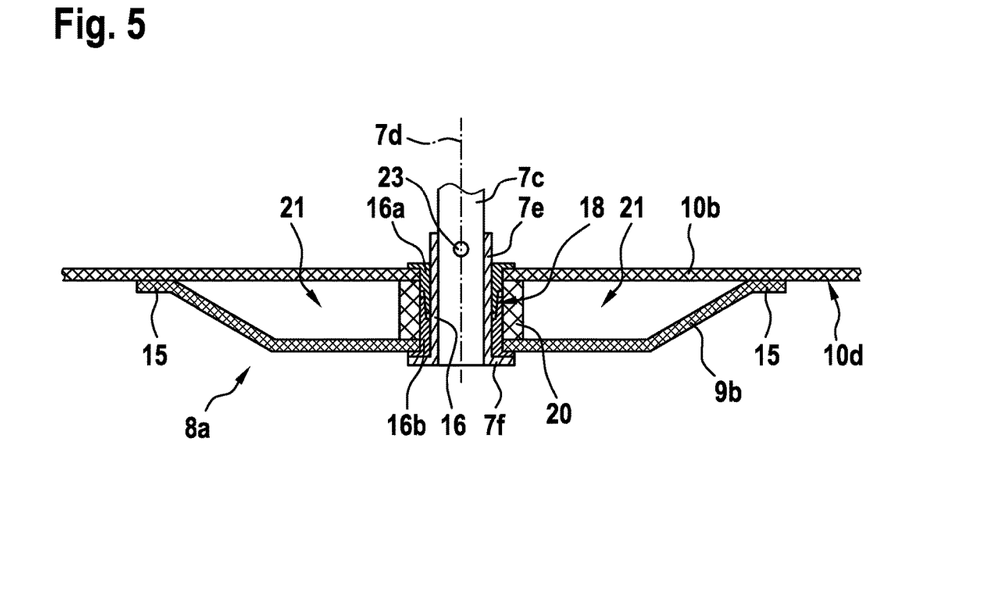
FIG. 5 shows a sectional view of one aircraft structural component of FIG. 2, which is embodied according to a second embodiment.

FIG. 5 shows the aircraft structural component 8a of FIG. 3 with the starboard side FRP-longeron 10b and the starboard side reinforcing FRP-structure 9b that is provided with the strap-like elements 15. However, in contrast to FIG. 3 the starboard side reinforcing FRP-structure 9b is now exemplarily arranged on an outer side surface 10d of the starboard side FRP-longeron 10b, which is also referred to as the "outside" hereinafter for simplicity and which faces the support flange 7f of the attachment shaft 7e of FIG. 3.

The attachment shaft 7e is preferably embodied as a force transmitting shaft that is preferentially non-pivotally connectable to the rotatable shaft 7c by means of at least one associated fixation bolt 23. Illustratively, a single fixation bolt 23 is used to rigidly attach the attachment shaft 7e to the rotatable shaft 7c such that the latter cannot rotate relative to the attachment shaft 7e.

In contrast to FIG. 3, however, the starboard side reinforcing structure 9b now illustratively comprises an at least approximately trapezoidal groove-like cross section and the bearing element 16 is now exemplarily embodied as a gliding bearing in the form of a two-part component that comprises a first section 16a and a second section 16b. The first section 16a is preferably provided with a first outer collar that abuts against the starboard side FRP-longeron 10b and the second section 16b is provided with a second outer collar that preferably abuts against the starboard side reinforcing structure 9b and the support flange 7f of the attachment shaft 7e. The first and second sections 16a, 16b are preferably rigidly attached to each other, preferentially by a screw connection such as the screw connection 18 of FIG. 3, so that the first and second outer collars tighten the connection between the starboard side FRP-longeron 10b and the starboard side reinforcing FRP-structure 9b, which are again spaced apart from each other by means of the spacer 20 of FIG. 3.

By using the two-part bearing element 16 according to FIG. 5, a required number of constituent components of the aircraft structural component 8a can advantageously be reduced. More specifically, by using the two-part bearing element 16, use of the bearing sleeve wall 17 and the screw nut 19 of FIG. 3 can be omitted.

Figure 6:
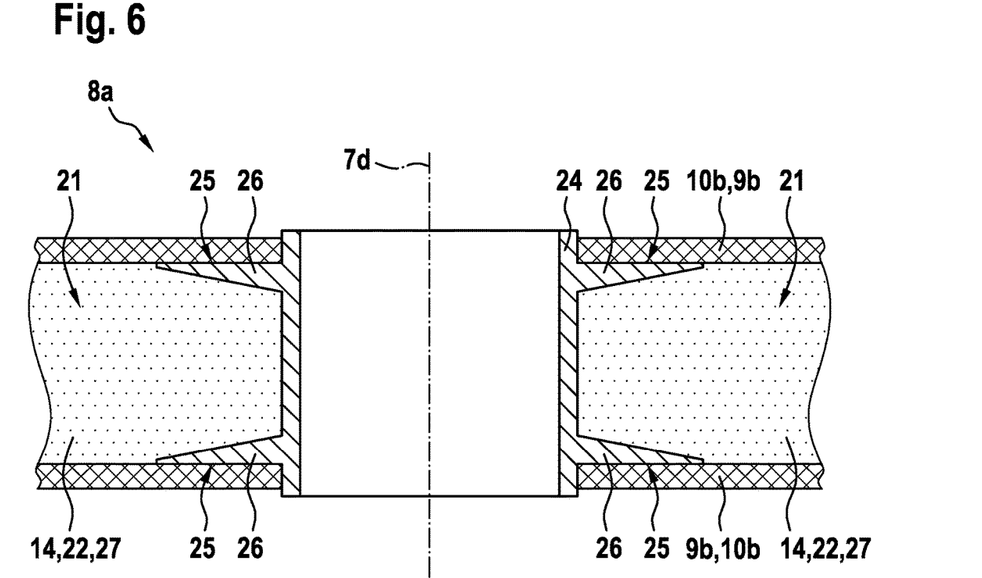
FIG. 6 shows a sectional view of one aircraft structural component of FIG. 2, which is provided with a bushing according to a third embodiment.

FIG. 6 shows the aircraft structural component 8a of the preceding figures, which is now exemplarily provided with a bushing 24 instead of the bearing element 16, the bearing sleeve wall 17, the screw nut 19 and the spacer 20 described above. Preferably, the bushing 24 is adapted for pivotally bearing the rotatable shaft 7c of the preceding figures such that the latter is rotatable relative to the bushing 24.

According to one aspect of the present invention, the bushing 24 comprises at least two bonding surface ribs 26 that are respectively glued to the starboard side FRP-longeron 10b or the starboard side reinforcing FRP-structure 9b by means of a suitable adhesive 25. Additionally, or alternatively, the starboard side FRP-longeron 10b or the starboard side reinforcing FRP-structure 9b can be riveted and/or screwed to the at least two bonding surface ribs 26.

The bonding surface ribs 26 are preferably embodied as ring-shaped, i.e. annular outer collars or flanges of the bushing 24. A predetermined distance between the bonding surface ribs 26 determines an axial distance between the starboard side FRP-longeron 10b and the starboard side reinforcing FRP-structure 9b, in analogy to the spacer 20 of the preceding figures, for defining the cavities 21.

By way of example, the cavities 21 are now at least partly filled with a dissolvable core 27. Such a dissolvable core 27 can be washed out after curing, as described in more detail below with reference to FIG. 15. However, it should be noted that the cavities 21 may alternatively at least partly be filled with the foam core 22 of FIG. 4 or the honeycomb core 14 of FIG. 1.

Figure 7:
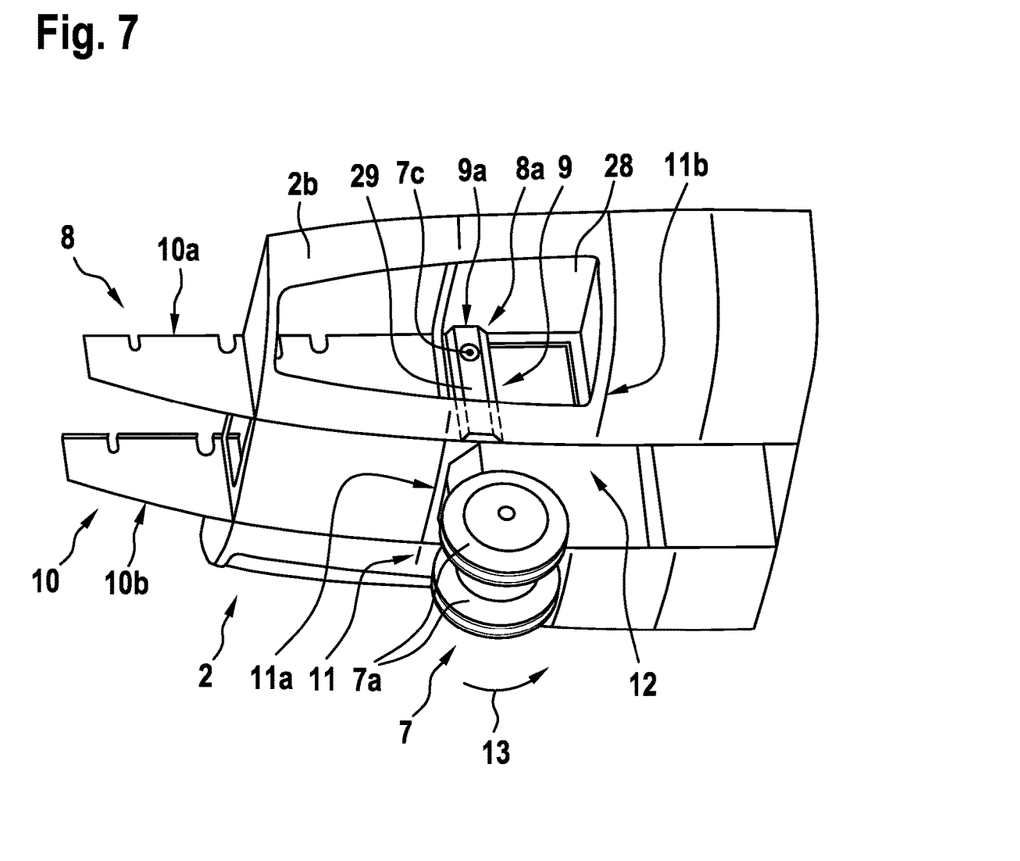
FIG. 7 shows a perspective view of the force-absorbing structure of FIG. 2, which is provided with one-sided, vertically arranged aircraft structural components according to the present invention.

FIG. 7 shows the fuselage 2 of the helicopter 1 of FIG. 1 with the force-absorbing structure 8 provided at the fuselage's bottom shell 2b in the region of the wheel-type nose landing gear 7. By way of example, the force-absorbing structure 8 is now provided with the aircraft structural components 8a according to FIG. 5, which comprise the reinforcing structures 9 with an at least approximately trapezoidal groove-like cross section.

According to one aspect of the present invention, the aircraft structural components 8a are now arranged vertically from a cockpit floor 28 defined by the fuselage 2 in direction of the wheels 7a of the wheel-type nose landing gear 7, preferably over the entire height of the force-absorbing structure 8, and not diagonally as illustrated in FIG. 2. Thus, the aircraft structural components 8a now define vertical reinforcing arrangements 29.

Figure 8:
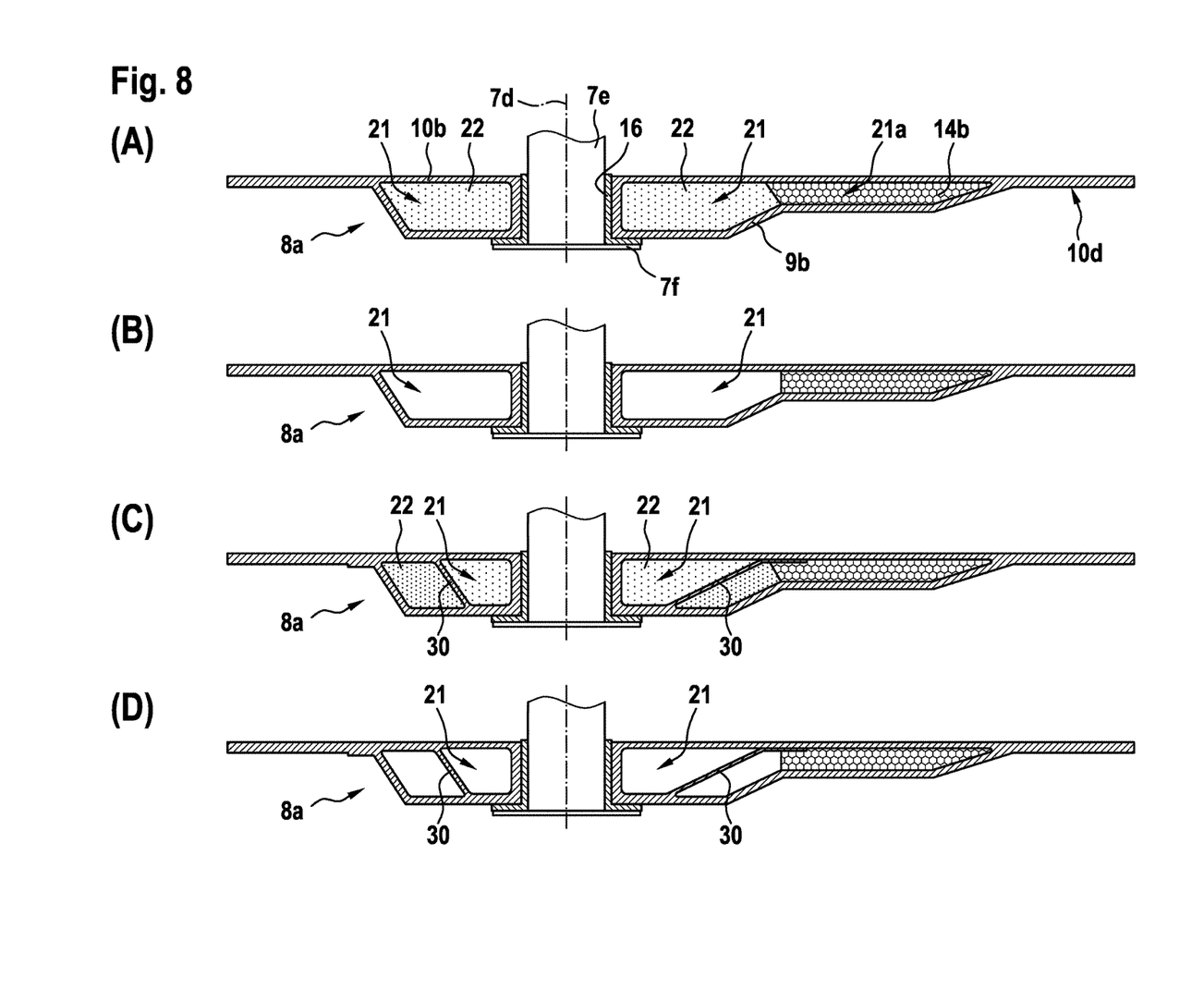
FIG. 8 shows sectional views of one aircraft structural component of FIG. 2 or FIG. 7, which is provided with an optional honeycomb core according to the present invention.

FIG. 8 shows variants (A) to (D) of the aircraft structural component 8a of FIG. 7, which are represented in a slightly simplified manner for simplicity and clarity of the drawings. In all these variants (A) to (D), the starboard side reinforcing FRP-structure 9b is representatively arranged on the outside 10d of the starboard side FRP-longeron 10b.

According to variant (A), the cavities 21 of the aircraft structural component 8a are exemplarily at least partly filled with the foam core 22. Furthermore, an additional cavity 21a is provided adjacent to one of the cavities 21. This additional cavity 21a exemplarily houses the starboard side honeycomb core 14b of FIG. 2, which can e.g. be attached to the foam core 22 by means of an adhesive film, which is preferentially applied prior to curing.

Variant (B) mainly differs from variant (A) in that the cavities 21 are now hollow.

Variant (C) mainly differs from variant (A) in that the cavities 21 are now subdivided into separate compartments by means of dividing walls 30 so that a transmissible transversal force can be increased advantageously. Thus, different cores can be inserted into the different compartments. For instance, a part of the compartments can be filled with the foam core 22, while another part is filled with the dissolvable core 27 of FIG. 6. However, for simplicity and clarity of the drawings, only an at least partial filling with the foam core 22 is illustrated in all compartments.

Variant (D) mainly differs from variant (C) in that the cavities 21 are now hollow again.

Figure 9:
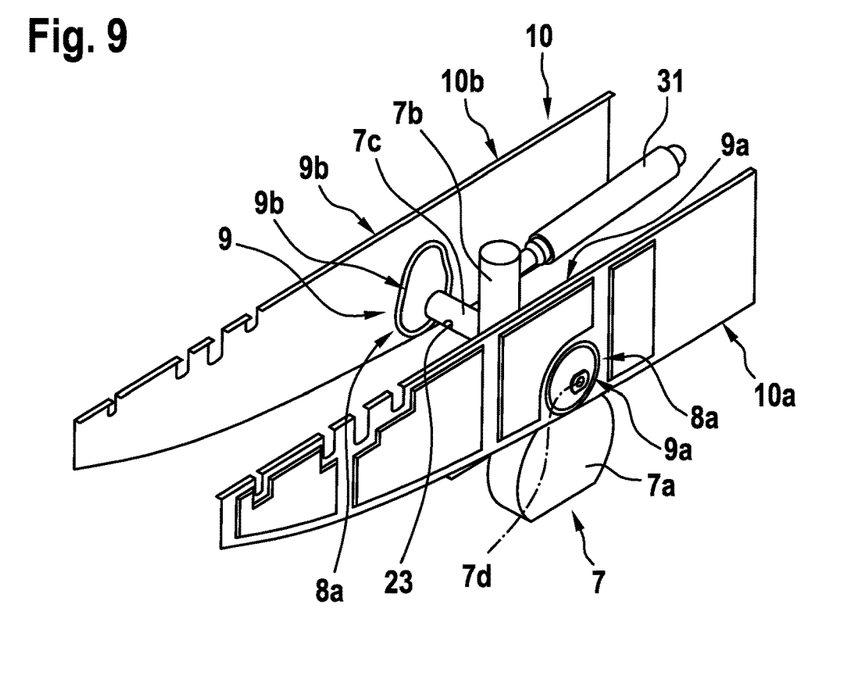
FIG. 9 shows a perspective view of a section of the force-absorbing structure of FIG. 2, which is provided with two-sided aircraft structural components according to the present invention.

FIG. 9 shows the wheel-type nose landing gear 7 of FIG. 2 and FIG. 7, which is pivotally mounted to the aircraft structural components 8a of the FRP-longerons 10 of FIG. 2 and FIG. 7 by means of the rotatable shaft 7c of FIG. 2 and FIG. 7. The FRP-longerons 10 are now preferably designed in the so-called prepreg-sandwich-architecture with polyamide paper honeycomb cores. The rotatable shaft 7c is exemplarily connected via the mounting shaft 7b to an associated actuator 31, which is actuatable for rotating the rotatable shaft 7c via the mounting shaft 7b.

According to one aspect of the present invention, each aircraft structural component 8a is now provided with at least one reinforcing FRP-structure 9 on either side of its associated FRP-longeron 10. More specifically, the aircraft structural component 8a that is provided at the starboard side FRP-longeron 10b is provided with the starboard side reinforcing FRP-structure 9b on the longeron side that faces the mounting shaft 7b as well as on the longeron side that faces away from the mounting shaft 7b. Similarly, the aircraft structural component 8a that is provided at the board side FRP-longeron 10a is provided with the board side reinforcing FRP-structure 9a on the longeron side that faces the mounting shaft 7b as well as on the longeron side that faces away from the mounting shaft 7b.

Preferably, at least one and preferentially each one of the reinforcing FRP-structures 9 is provided with a predetermined shaping and arranged around the attachment shaft 7e described above, i.e. around the rotatable shaft 7c. By way of example, the board side reinforcing FRP-structure 9a on the longeron side of the board side FRP-longeron 10a that faces away from the mounting shaft 7b has a circular shaping, i.e. geometry, and surrounds the rotatable shaft 7c at least partly. This preferably similarly applies to the starboard side reinforcing FRP-structure 9b on the longeron side of the starboard side FRP-longeron 10b that faces away from the mounting shaft 7b.

Furthermore, according to one aspect of the present invention at least one of the reinforcing FRP-structures 9 is provided with a first geometry on a first side of its associated FRP-longeron 10 and with a second geometry on a second side of its associated FRP-longeron 10. By way of example, while the board side reinforcing FRP-structure 9a on the longeron side of the board side FRP-longeron 10a that faces away from the mounting shaft 7b has a circular geometry as described above, the board side reinforcing FRP-structure 9a on the longeron side of the board side FRP-longeron 10a that faces the mounting shaft 7b illustratively comprises an egg-shaped geometry. This preferably similarly applies to the starboard side reinforcing FRP-structure 9b on the longeron side of the starboard side FRP-longeron 10b that faces the mounting shaft 7b and that preferably also comprises an egg-shaped geometry.

Figure 10:
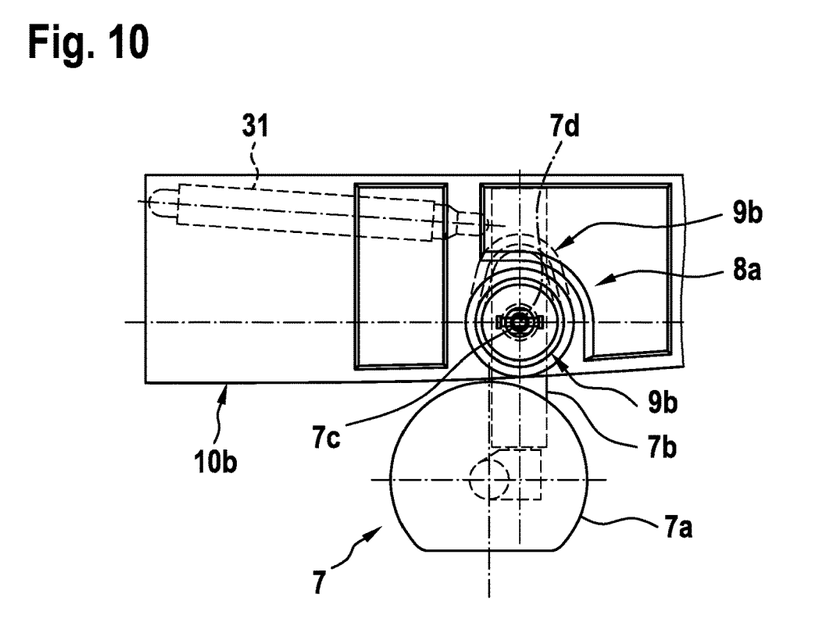
FIG. 10 shows a partly transparent side view of the arrangement of FIG. 9.

FIG. 10 shows the arrangement of FIG. 9 for further illustrating the aircraft structural component 8a with the starboard side reinforcing FRP-structure 9b on the longeron side of the starboard side FRP-longeron 10b that faces away from the mounting shaft 7b and that comprises a circular shaping, i.e. geometry, and with the starboard side reinforcing FRP-structure 9b on the longeron side of the starboard side FRP-longeron 10b that faces the mounting shaft 7b and that preferably comprises an egg-shaped geometry. The circular geometry and the egg-shaped geometry lead to an asymmetric arrangement of the starboard side reinforcing FRP-structures 9b on the starboard side FRP-longeron 10b. Alternatively, a symmetrical arrangement can be contemplated in order to minimize distortion. FIG. 10 further illustrates the actuator 31.

Figure 11:
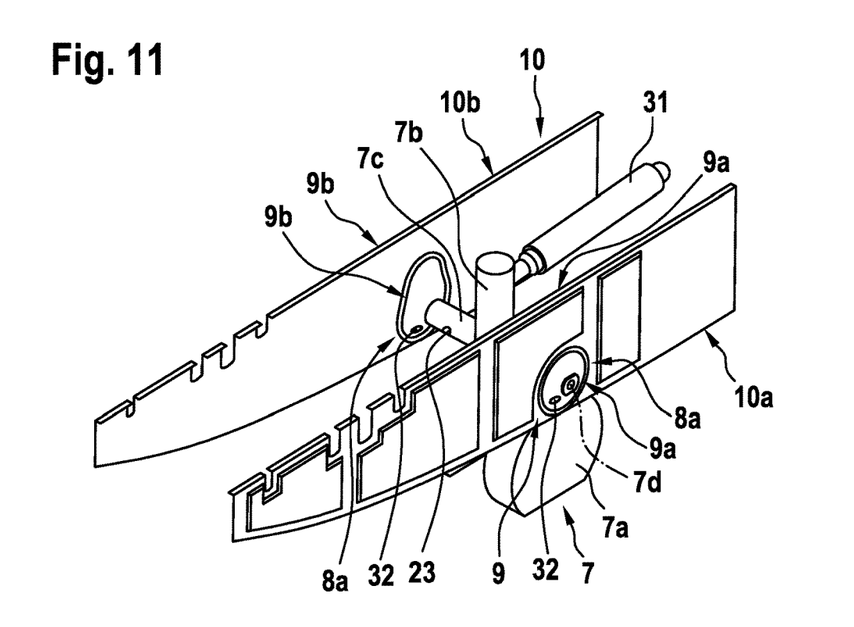
FIG. 11 shows a perspective view of a section of the force-absorbing structure of FIG. 2, which comprises longerons that are provided with two-sided aircraft structural components having a dissolvable core and washing holes according to the present invention.

FIG. 11 shows the arrangement of FIG. 9 with the aircraft structural components 8a that comprise the reinforcing FRP-structures 9 on either side of the associated FRP-longerons 10. However, in contrast to FIG. 9 each aircraft structural component 8a is now provided with at least two openings 32 that are adapted to allow washing out of a dissolvable core, such as the dissolvable core 27 of FIG. 6, provided in the respective aircraft structural component 8a. Therefore, the openings 32 are also referred to as the "washing holes" hereinafter. Each such washing hole 32 preferably comprises an opening dimension, i.e. a diameter of at least 12 mm.

By way of example, one washing hole 32 is provided in each one of the reinforcing FRP-structures 9. More specifically, one washing hole 32 is provided in the starboard side reinforcing FRP-structure 9b on the longeron side of the starboard side FRP-longeron 10b that faces away from the mounting shaft 7b, and another washing hole 32 is provided in the starboard side reinforcing FRP-structure 9b on the longeron side of the starboard side FRP-longeron 10b that faces the mounting shaft 7b. This preferably applies similarly to the board side reinforcing structures 9a of the board side FRP-longerons 10a.

Figure 12:
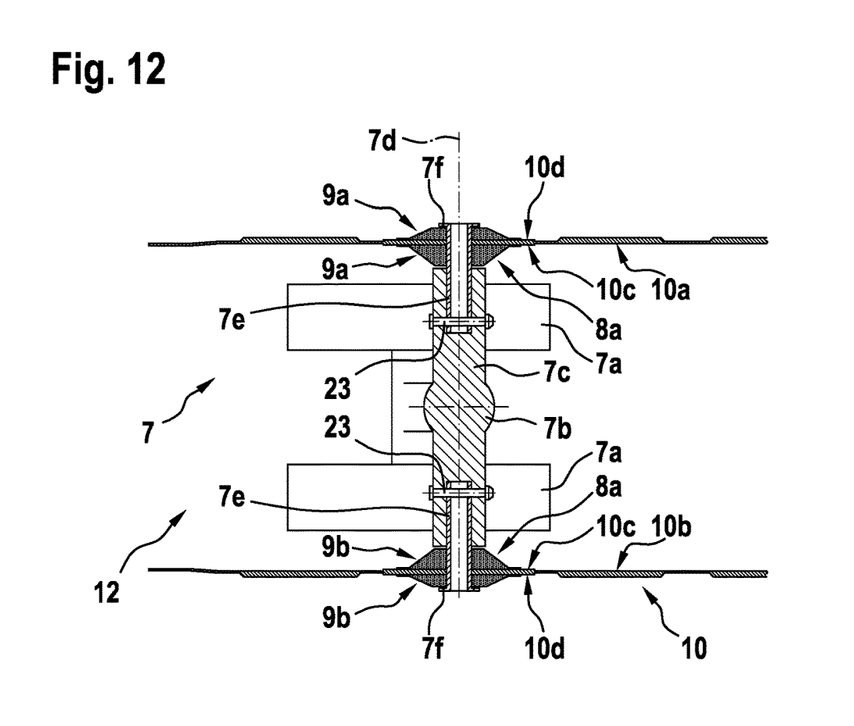
FIG. 12 shows a partly cut top view of the arrangement of FIG. 11, seen in height direction of the longerons.

FIG. 12 shows the arrangement of FIG. 11 with the wheel-type nose landing gear 7 for further illustrating the provision of the board side reinforcing FRP-structures 9a on either side, i.e. the inside 10c and the outside 10d, of the board side FRP-longeron 10a and of the starboard side reinforcing FRP-structures 9b on either side, i.e. the inside 10c and the outside 10d, of the starboard side FRP-longeron 10b. FIG. 12 further illustrates the non-rotatable attachment of the attachment shafts 7e to the rotatable shaft 7c by means of the fixation bolts 23.

In operation, axial forces from the wheel-type nose landing gear 7 are transmitted through the transversal fixation bolts 23 and their front faces into the fuselage 2 of the helicopter 1 of FIG. 1. The radial forces of the wheel-type nose landing gear 7 are transmitted through the attachment shafts 7e, the surrounding bearing elements (16 in FIG. 3 and FIG. 4), the aircraft structural components 8a and the FRP-longerons 10 into the fuselage 2.

Figure 13:
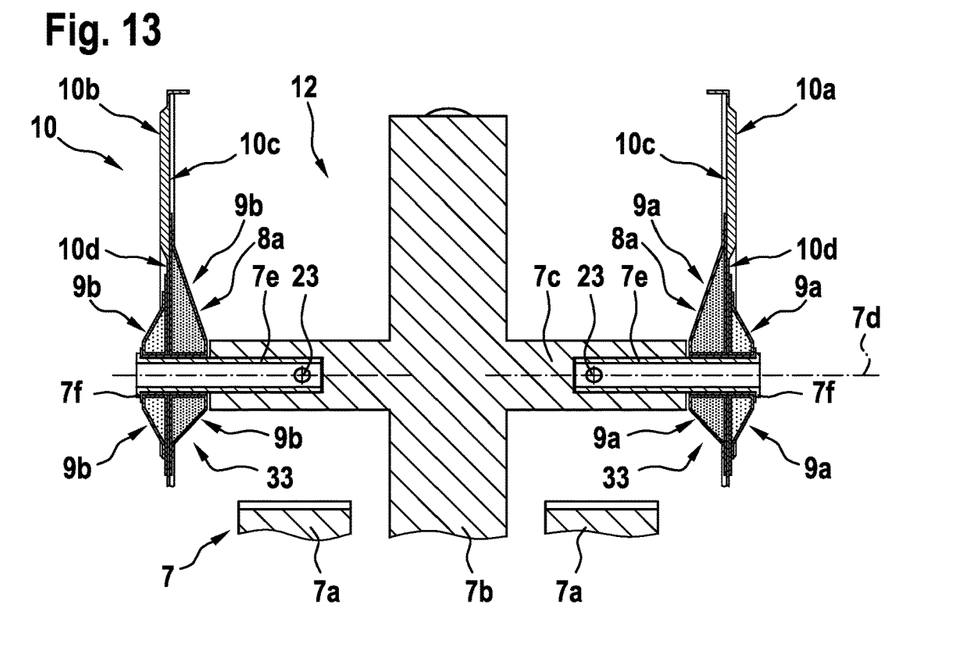
FIG. 13 shows a sectional view of the arrangement of FIG. 11, seen in longitudinal direction of the longerons.

FIG. 13 shows the arrangement of FIG. 12 for further illustrating an exemplary circular geometry according to FIG. 9 of the board side and starboard side reinforcing FRP-structures 9a, 9b that are respectively provided on the outsides 10d of the board side and starboard side FRP-longerons 10a, 10b. FIG. 13 also further illustrates an exemplary egg-shaped geometry according to FIG. 9 of the board side and starboard side reinforcing FRP-structures 9a, 9b that are respectively provided on the insides 10c of the board side and starboard side FRP-longerons 10a, 10b.

Figure 14:
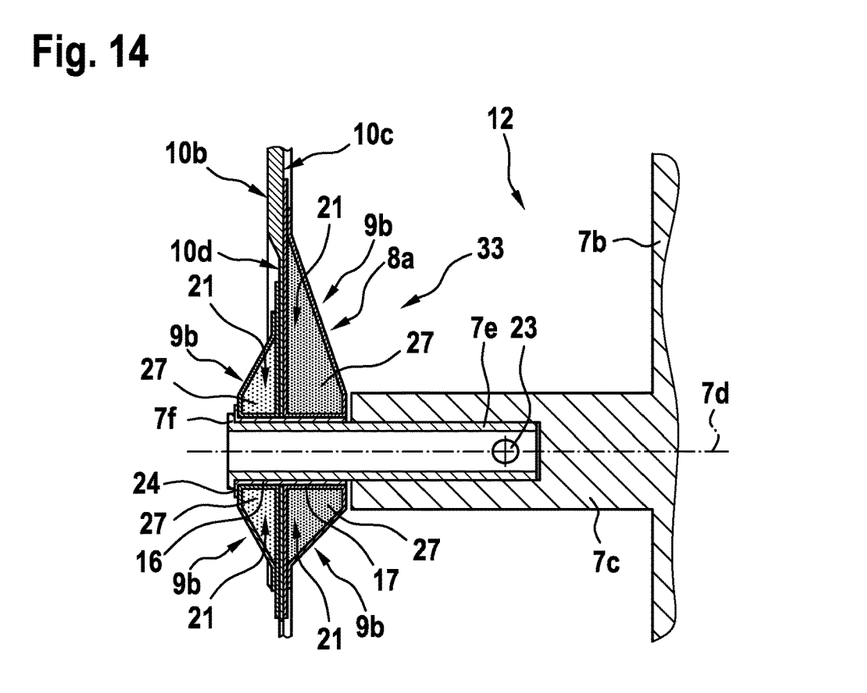
FIG. 14 shows an enlarged detail of FIG. 13.

FIG. 14 shows an enlargement of the arrangement of FIG. 12 and FIG. 13 for further illustrating provision of the dissolvable core 27 of FIG. 6 in the aircraft structural component 8a, i.e. in the cavities 21 that are created by means of the starboard side reinforcing FRP-structures 9b. Illustratively, the starboard side reinforcing FRP-structures 9b define together with the starboard side FRP-longeron 10b a longeron and reinforcing substructure 33 of the force-absorbing structure 8 of FIG. 2 and FIG. 7.

Figure 15:
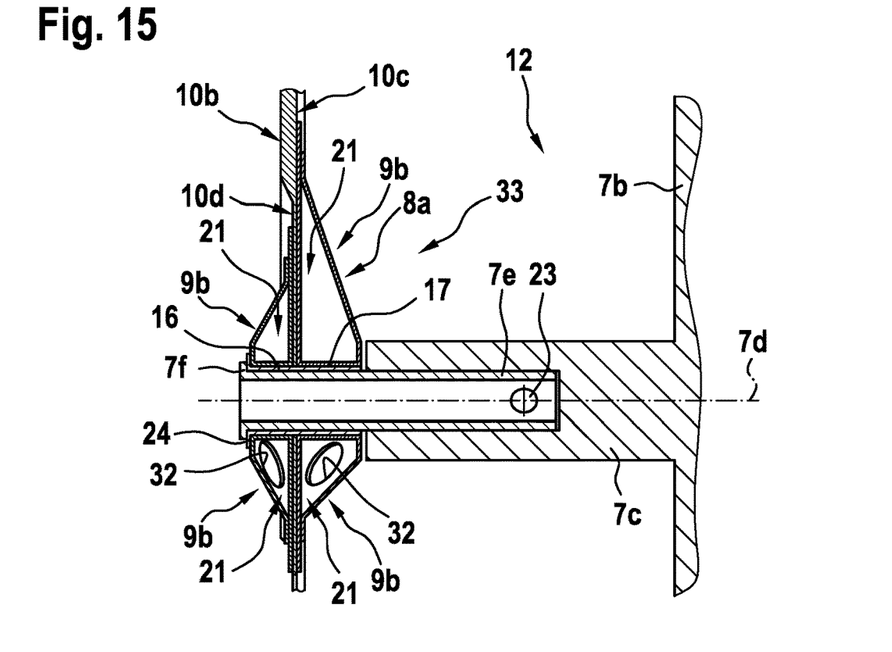
FIG. 15 shows the enlarged detail of FIG. 14 after washing out of the dissolvable core.

FIG. 15 shows the arrangement of FIG. 14 after washing out of the dissolvable core 27 from the aircraft structural component 8a, i.e. from the cavities 21, via the washing holes 32 that are provided in the starboard side reinforcing FRP-structures 9b. Accordingly, the cavities 21 are now hollow.

It should be noted that a corresponding washing out process can be performed using any suitable dissolver that is adapted for dissolving the dissolvable core 27. Such washing out processes, dissolvers and also suitable materials for the dissolvable core 27 are, however, well-known to the person skilled in the art, so that a detailed description thereof can be omitted hereinafter for simplicity and brevity of the description.

Figure 16:
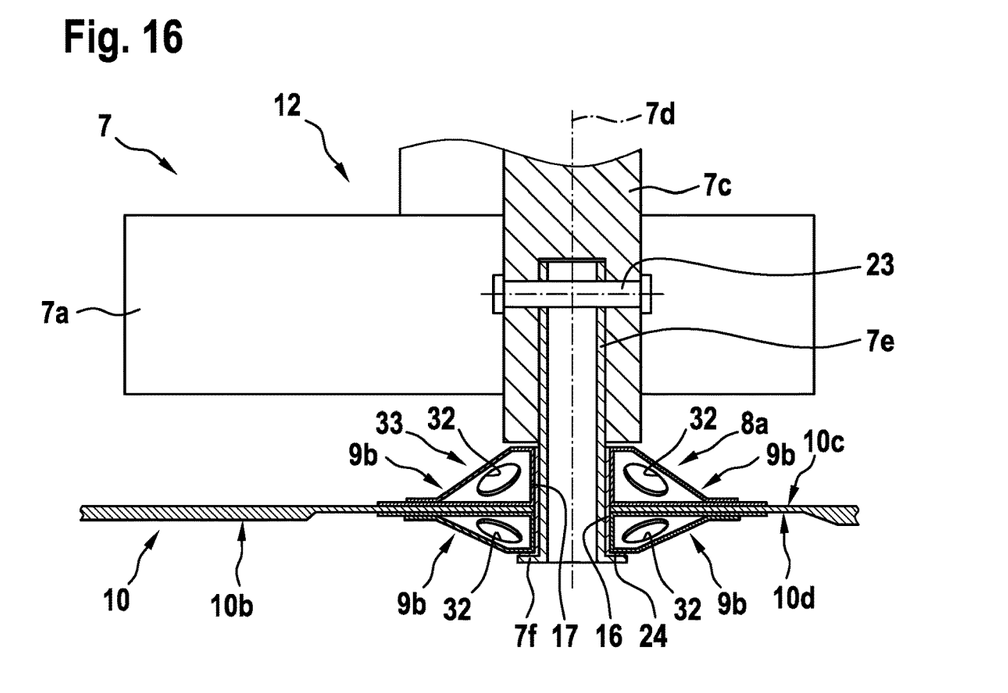
FIG. 16 shows the enlarged detail of FIG. 14 after washing out of the dissolvable core, seen in height direction of the longerons.

FIG. 16 shows an enlargement of the arrangement of FIG. 12 after washing out of the dissolvable core 27 from the aircraft structural component 8a using the washing holes 32 that are provided in the starboard side reinforcing FRP-structures 9b. Accordingly, the cavities 21 are now hollow and, by way of example, four washing holes 32 are illustrated in the aircraft structural component 8a.

It should be noted that the present invention is described above only with reference to an attachment of a wheel-type nose landing gear of a helicopter by way of example. However, the present invention is not limited to such an application with a wheel-type nose landing gear of a helicopter, but may generally be applied to all landing gears in aircrafts. It is further applicable e.g. to the following bracket attachments: a nose landing gear bracket attachment in a helicopter or airplane, a main landing gear bracket attachment in a helicopter or airplane, a main gearbox bracket attachment in a helicopter, a bracket attachment for foldable tail booms in a helicopter, a radome cover bracket in a helicopter or airplane and/or a mooring bracket attachment in a helicopter or airplane. Furthermore it is applicable to all force transmitting connections/load introductions.

It should further be noted that modifications to the above-described embodiments are also within the common knowledge of the person skilled in the art and, thus, also considered as being part of the present invention.

REFERENCE LIST 1 rotary wing aircraft
1a main rotor
1b counter-torque device
2 fuselage
2a tail boom
2b bottom shell
3 tail boom aft-section
3a shroud
4 bumper
5 fin
5a tail wing
5b rudder
6 wheel-type rear landing gear
7 wheel-type nose landing gear
7a nose landing gear wheels
7b mounting shaft
7c rotatable shaft
7d rotation axis
7e attachment shaft
7f support flange
8 force-absorbing structure
8a aircraft structural component
9 reinforcing structures
9a board side reinforcing structure
9b starboard side reinforcing structure
10 longerons
10a board side longeron
10b starboard side longeron
10c starboard side longeron inside
10d starboard side longeron outside
11 crossmembers
11a front crossmember
11b rear crossmember
12 nose landing gear bay
13 rotation direction
14 honeycomb cores
14a board side honeycomb core
14b starboard side honeycomb core
15 bonding straps
16 bearing element
16a first bearing element section
16b second bearing element section
17 bearing sleeve wall
18 screw connection
19 screw nut
20 spacer
21 cavity
21a additional cavity
22 foam core
23 fixation bolt
24 bushing
25 adhesive
26 bonding surface ribs
27 dissolvable core
28 cockpit floor
29 vertical reinforcing arrangement
30 dividing walls
31 actuator
32 washing holes
33 longeron and reinforcing substructure

What is claimed is:

1. An aircraft comprising a force-absorbing structure comprising a plurality of structural components adapted for absorbing and transmitting forces in an aircraft, at least one of the structural components comprising a first panel element, a second panel element, a first reinforcing structure, and a second reinforcing structure, the first and second panel elements and the first and second reinforcing structure comprising fiber reinforced polymers; the first reinforcing structure being rigidly attached to the first panel element such that at least a first cavity is defined between the first panel element and the first reinforcing structure, the second reinforcing structure being rigidly attached to the second panel element such that at least a second cavity is defined between the second panel element and the second reinforcing structure, the aircraft being a rotorcraft and the force-absorbing structure is provided at a fuselage of the rotorcraft; the reinforcing structures being rigidly attached to the panel elements by means of a collective curing with the panel elements; the rotorcraft comprising a wheel landing gear having a rotatable shaft; at least one of the reinforcing structures being provided on either side of each of the two panel elements; the reinforcing structures on either side of each of the first and second panel elements pivotally bearing on the fuselage a bearing of the rotatable shaft of a wheel landing gear.

2. The aircraft according to claim 1, wherein each of the reinforcing structures comprises a strap element rigidly attached to one of the panel elements.

3. The aircraft according to claim 2, wherein each of the strap elements is rigidly attached to one of the panel elements by means of riveting and/or bonding.

4. The aircraft according to claim 1, wherein the first cavity is at least partly filled with a foam core and/or a honeycomb core.

5. The aircraft according to claim 1, wherein a third cavity is defined adjacent to the first cavity between the first panel element and the first reinforcing structure, the third cavity being at least partly filled with a foam core and/or a honeycomb core.

6. The aircraft according to claim 1, wherein a force transmitting attachment shaft is provided for pivotally connecting the rotatable shaft to first panel element and the first reinforcing structure, the force transmitting attachment shaft being non-pivotally connectable to the rotatable shaft by means of at least one associated fixation bolt.

7. The aircraft according to claim 6, wherein the first panel element and the first reinforcing structure are provided with at least one bearing element, the force transmitting attachment shaft being pivotally accommodated in the at least one bearing element.

8. The aircraft according to claim 6, wherein the first reinforcing structure is arranged with a predetermined shaping around the force transmitting attachment shaft.

9. The aircraft according to claim 1, wherein the first reinforcing structure is provided with a first geometry on a first side of the first panel element and with a second geometry on a second side of the first panel element.

10. The aircraft according to claim 1, wherein the first reinforcing structure comprises at least one opening that is adapted to allow washing out of a dissolvable core provided in the first cavity.

11. A rotorcraft comprising:
a fuselage having a force-absorbing structure and a wheel landing gear having a rotatable shaft;
the force-absorbing structure comprising a plurality of structural components;
at least one of the structural components comprising:
a first panel element attached to a first reinforcing structure defining a first cavity between the first panel element and the first reinforcing structure; and
a second panel element attached to a second reinforcing structure defining a second cavity between the second panel element and the second reinforcing structure, the panel elements and the reinforcing structures comprising fiber reinforced polymers;
each of the first and second reinforcing structures being provided on either side of a respective one of the first and second panel elements; the reinforcing structures pivotally bearing on the fuselage a bearing of the rotatable shaft of the wheel landing gear.

12. The rotorcraft according to claim 11, wherein each of the reinforcing structures comprises a first portion rigidly attached to one of the panel elements.

13. The rotorcraft according to claim 12, wherein each of the first portion is rigidly attached to one of the panel elements by riveting and/or bonding.

14. The rotorcraft according to claim 11, wherein the first cavity is at least partly filled with a foam core and/or a honeycomb core.

15. The rotorcraft according to claim 11, wherein a third cavity is defined adjacent to the first cavity between the first panel element and the first reinforcing structure, the third cavity being at least partly filled with a foam core and/or a honeycomb core.

16. The rotorcraft according to claim 11, further comprising a force transmitting attachment shaft pivotally connecting the rotatable shaft to first panel element and the first reinforcing structure, the force transmitting attachment shaft being non-pivotally connectable to the rotatable shaft by at least one associated fixation bolt.

17. The rotorcraft according to claim 16, wherein the first panel element and the first reinforcing structure have a bearing element, the force transmitting attachment shaft being pivotally accommodated in the bearing element.

18. An aircraft comprising a force-absorbing structure comprising plurality of structural components, at least one of the structural components comprising a first panel element, a second panel element, a first reinforcing structure, and a second reinforcing structure, the panel elements and the reinforcing structure comprising fiber reinforced polymers; the first reinforcing structure attached to the first panel element defining a first cavity between the first panel element and the first reinforcing structure, the second reinforcing structure attached to the second panel element defining a second cavity between the second panel element and the second reinforcing structure, the force-absorbing structure is provided at a fuselage of the aircraft; the aircraft comprising a wheel landing gear having a rotatable shaft; the reinforcing structures being provided on either side of each of the panel elements and pivotally bearing on the fuselage a bearing of the rotatable shaft of a wheel landing gear.

19. The aircraft according to claim 18, wherein each of the aircraft comprises a rotorcraft.

20. The aircraft according to claim 19, wherein each of the reinforcing structures comprises a first member rigidly attached to one of the panel elements.

* * * * *